C. F. HESS.
TIRE HOLDER.
APPLICATION FILED JUNE 22, 1914.
1,155,488.
Patented Oct. 5, 1915.
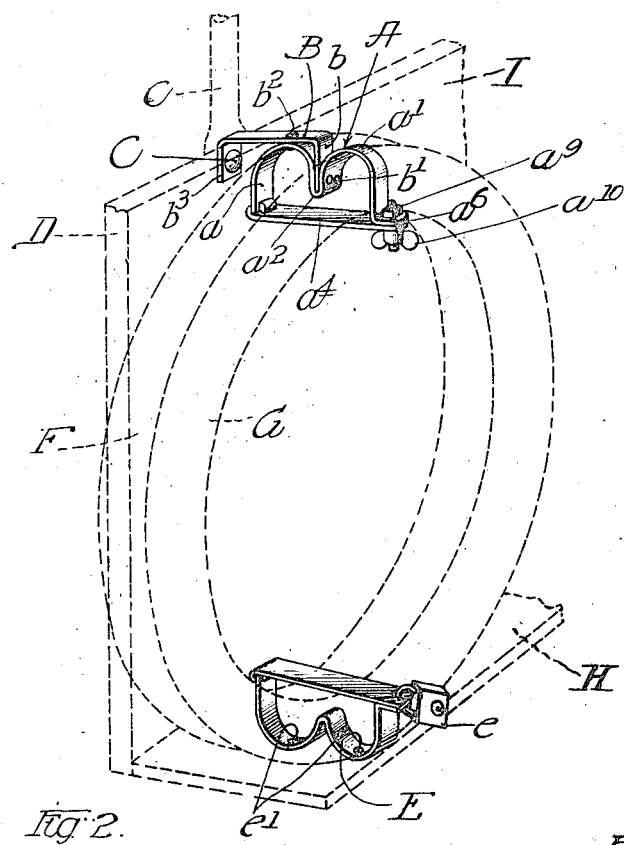
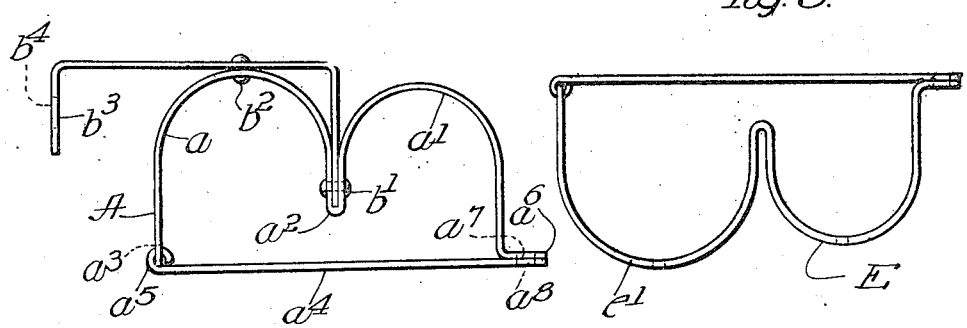

UNITED STATES PATENT OFFICE.

CHRISTIAN F. HESS, OF CHICAGO, ILLINOIS, ASSIGNOR TO ALEXANDER NELSON, OF CHICAGO, ILLINOIS.

TIRE-HOLDER.

1,155,488.

Specification of Letters Patent.

Patented Oct. 5, 1915.

Application filed June 22, 1914. Serial No. 846,483.

*To all whom it may concern:*

Be it known that I, CHRISTIAN F. HESS, a citizen of the United States of America, and resident of Chicago, Cook county, Illinois, have invented certain new and useful Improvements in Tire-Holders, of which the following is a specification.

My invention relates to tire holders for holding one or more extra tires in place at the side of an automobile.

In certain respects my invention is in the nature of an improvement on the tire holder shown and described in my co-pending application Serial No. 846,482 of even date herewith. In said application I have claimed my invention broadly, and in this application I have claimed the specific construction whereby a holder of this kind is fastened between the wind shield brace and the body of the car, which brace is found, for example, on the well known Ford touring car.

The object of my present invention is, therefore, to provide a tire holder of simple and inexpensive form and construction, having provisions whereby it may be fastened in place between the wind shield brace and the body of the car, as previously stated, and of such character that it will not interfere with the proper use of the automobile.

To these and other useful ends my invention consists in matters hereinafter set forth and claimed.

In the accompanying drawings—Figure 1 is a perspective of a tire holder embodying the principles of my invention. Fig. 2 is a side elevation of the upper holder. Fig. 3 is a side elevation of the lower holder.

As thus illustrated, my invention comprises a piece of strap iron A bent into shape to provide a pair of arches $a$ and $a^1$, the former being somewhat larger than the latter, whereby two tires of different sizes may be held in place. The supporting bracket B is formed from a piece of strap iron, the ends thereof being bent downward to provide a portion $b$ which is fastened by a rivet $b^1$ between the two portions of the loop $a^2$ formed between the two arches. The horizontal upper portion of said bracket is fastened in place to the arch $a$ by means of a rivet $b^2$, and the other end of this bracket is bent downward to provide the attaching portion $b^3$, which latter has an opening $b^4$ for this purpose. The outer lower end of the arch $a$ has a slot $a^3$, and the straight piece of strap iron $a^4$ has its eye portion $a^5$ inserted through said slot, whereby a hinge connection is provided. The lower outer end of the arch $a^1$ is provided with a horizontal out-turned portion $a^6$ having an opening $a^7$ therein, and the outer end of the hinge strap iron $a^4$ has a corresponding opening $a^8$, whereby these two portions are adapted to be connected together. For this purpose a bolt $a^9$ is inserted through openings $a^7$ and $a^8$, said bolt being provided with a thumb nut $a^{10}$ of any suitable character, whereby the hinged strap iron member $a^4$ can be held in horizontal position to keep the two tires in place.

As previously stated, my invention contemplates the supporting of said holder in a particular manner, and by utilizing the bolt which ordinarily holds the wind shield brace in place on the body of a Ford touring car. This bolt C, as is well known, holds the lower end of the wind shield brace $c$ in place on the body D, and the end portion $b^3$ is inserted downward between this brace and the body of the car, whereby said bolt extends through the opening $b^4$ to support the tire holder in position. In this way, and with this method, no mutilation nor reconstruction of the car body is necessary, the tire holder being supported in position by utilizing a bolt which is already and necessarily employed on the automobile for another purpose.

The lower holder E is like the one shown and described in my said other application, and is similar to the upper holder. It will be seen, however, that this lower holder is turned upside down, and does not have the bracket B. Also, and instead of the bolt $a^9$ and nut $a^{10}$ a padlock $e$ is employed for locking the two hinge connected members together. Thus the two tires F and G are held securely in position at one side of the automobile. Screws $e^1$ are inserted through the holder E to secure the same to the running board of the automobile. The side I of the automobile may be of any suitable character, and the running board H may be of the usual and well known form. With this arrangement, and with the holders A and E constructed and mounted as shown, the two tires are conveniently held at the side of the automobile, being arranged side by side on the running board, and being held in place at their upper ends by the bolt C which, as will be readily understood, is the bolt by which the wind shield brace is also held in place, as previously explained. Also, and in some automobiles, the running board H will be found to be provided with holes which are adapted to receive the screws or bolts $e^1$, whereby no special holes for this purpose are necessary. Thus the entire arrangement is adapted to be applied without mutilating or in any way changing the structure of the automobile.

What I claim as my invention is:—

1. In an automobile, and in combination with a wind shield brace bolt therefor, a tire holder comprising means for engaging and holding the top portion of the tire, a bracket forming a hanger for said means, said bracket being provided with means for engaging said bolt to support the holder in position at the side of the automobile.

2. In an automobile, and in combination with a wind shield brace bolt therefor, a tire holder comprising means for engaging and holding the top portion of the tire, a bracket forming a hanger for said means, secured to the top of said holder, said bracket being provided with means for engaging said bolt to support the holder in position at the side of the automobile, said bolt extending through the brace and the side of the automobile, and said bracket having a downturned end portion provided with an opening for said bolt, said end portion being inserted between the body and brace.

3. In an automobile, and in combination with a wind shield brace bolt therefor, a tire holder comprising means for engaging and holding the top portion of the tire, a bracket forming a hanger for said means, said bracket being provided with means for engaging said bolt to support the holder in position at the side of the automobile, said bracket consisting of a strap bent down at each end thereof, one end being secured between portions of the holder, and the other end engaging said bolt.

Signed by me at Chicago, Illinois, this 8th day of June, 1914.

CHRISTIAN F. HESS.

Witnesses:
RACHEL J. RICHARDSON,
ROSE E. SEHNEM.

Copies of this patent may be obtained for five cents each, by addressing the "Commissioner of Patents, Washington, D. C."